Aug. 28, 1962  W. O. FLECKENSTEIN  3,051,940
VARIABLE LENGTH CODE GROUP CIRCUITS
Filed Sept. 4, 1958  3 Sheets-Sheet 1

INVENTOR
W. O. FLECKENSTEIN
BY
Alan C. Rose
ATTORNEY

Aug. 28, 1962

W. O. FLECKENSTEIN 3,051,940

VARIABLE LENGTH CODE GROUP CIRCUITS

Filed Sept. 4, 1958

|   | TELETYPE CODE | | | | | VARIABLE LENGTH CODE SUFFIXED BY 1 | | | | | | | |
|---|---|---|---|---|---|---|---|---|---|---|---|---|---|
| SPACE | 0 | 0 | 1 | 0 | 0 | 0 | 0 | 1 | 0 | 0 | 0 | 0 | 0 |
| A | 1 | 1 | 0 | 0 | 0 | 0 | 1 | 0 | 0 | 1 | 0 | 0 | 0 |
| B | 1 | 0 | 0 | 1 | 1 | 0 | 1 | 0 | 1 | 0 | 0 | 1 | 0 | 0 |
| C | 0 | 1 | 1 | 1 | 0 | 0 | 1 | 0 | 1 | 0 | 1 | 1 | 0 | 0 |
| D | 1 | 0 | 0 | 1 | 0 | 0 | 1 | 0 | 1 | 1 | 1 | 0 | 0 | 0 |
| E | 1 | 0 | 0 | 0 | 0 | 0 | 1 | 1 | 0 | 1 | 0 | 0 | 0 |
| F | 1 | 0 | 1 | 1 | 0 | 0 | 1 | 1 | 1 | 0 | 0 | 1 | 0 | 0 |
| G | 0 | 1 | 0 | 1 | 1 | 0 | 1 | 1 | 1 | 0 | 1 | 1 | 0 | 0 |
| H | 0 | 0 | 1 | 0 | 1 | 0 | 1 | 1 | 1 | 1 | 1 | 0 | 0 | 0 |
| I | 0 | 1 | 1 | 0 | 0 | 1 | 0 | 0 | 0 | 1 | 0 | 0 | 0 |
| J | 1 | 1 | 0 | 1 | 0 | 1 | 0 | 0 | 1 | 0 | 0 | 0 | 1 | 0 |
| K | 1 | 1 | 1 | 1 | 0 | 1 | 0 | 0 | 1 | 0 | 0 | 1 | 1 | 0 |
| L | 0 | 1 | 0 | 0 | 1 | 1 | 0 | 0 | 1 | 0 | 1 | 1 | 0 | 0 |
| M | 0 | 0 | 1 | 1 | 1 | 1 | 0 | 0 | 1 | 1 | 1 | 0 | 0 | 0 |
| N | 0 | 0 | 1 | 1 | 0 | 1 | 0 | 1 | 0 | 1 | 0 | 0 | 0 | 0 |
| O | 0 | 0 | 0 | 1 | 1 | 1 | 0 | 1 | 1 | 1 | 0 | 0 | 0 | 0 |
| P | 0 | 1 | 1 | 0 | 1 | 1 | 1 | 0 | 0 | 0 | 0 | 1 | 0 | 0 |
| Q | 1 | 1 | 1 | 0 | 1 | 1 | 1 | 0 | 0 | 0 | 1 | 1 | 0 | 0 |
| R | 0 | 1 | 0 | 1 | 0 | 1 | 1 | 0 | 0 | 1 | 1 | 0 | 0 | 0 |
| S | 1 | 0 | 1 | 0 | 0 | 1 | 1 | 0 | 1 | 1 | 0 | 0 | 0 | 0 |
| T | 0 | 0 | 0 | 0 | 1 | 1 | 1 | 1 | 0 | 1 | 0 | 0 | 0 | 0 |
| U | 1 | 1 | 1 | 0 | 0 | 1 | 1 | 1 | 1 | 0 | 0 | 1 | 0 | 0 |
| V | 0 | 1 | 1 | 1 | 1 | 1 | 1 | 1 | 1 | 0 | 1 | 1 | 0 | 0 |
| W | 1 | 1 | 0 | 0 | 1 | 1 | 1 | 1 | 1 | 1 | 0 | 1 | 0 | 0 |
| X | 1 | 0 | 1 | 1 | 1 | 1 | 1 | 1 | 1 | 1 | 1 | 0 | 1 | 0 |
| Y | 1 | 0 | 1 | 0 | 1 | 1 | 1 | 1 | 1 | 1 | 1 | 1 | 0 | 1 |
| Z | 1 | 0 | 0 | 0 | 1 | 1 | 1 | 1 | 1 | 1 | 1 | 1 | 1 | 1 |
| ALL OTHER CODES | | | | | | 0 | 0 | 1 | 0 | 0 | 0 | 0 | 0 | 0 |

INVENTOR
W. O. FLECKENSTEIN
BY
Alan C. Rose
ATTORNEY

Aug. 28, 1962   W. O. FLECKENSTEIN   3,051,940
VARIABLE LENGTH CODE GROUP CIRCUITS
Filed Sept. 4, 1958                                         3 Sheets-Sheet 3

FIG. 3

| LETTER | VARIABLE LENGTH CODE PREFIXED BY 1 AND SHIFTED TO THE RIGHT | | | | | | | | TELETYPE CODE OUTPUT | | | | | OUT. TO CLEAR SHIFT REG. |
|---|---|---|---|---|---|---|---|---|---|---|---|---|---|---|
| SPACE | 0 | 0 | 0 | 0 | 0 | 1 | 0 | 0 | 0 | 0 | 1 | 0 | 0 | 1 |
| A | 0 | 0 | 0 | 0 | 1 | 0 | 1 | 0 | 1 | 1 | 0 | 0 | 0 | 1 |
| B | 0 | 0 | 1 | 0 | 1 | 0 | 1 | 0 | 1 | 0 | 0 | 1 | 1 | 1 |
| C | 0 | 0 | 1 | 0 | 1 | 0 | 1 | 1 | 0 | 1 | 1 | 1 | 0 | 1 |
| D | 0 | 0 | 0 | 1 | 0 | 1 | 0 | 1 | 1 | 0 | 0 | 1 | 0 | 1 |
| E | 0 | 0 | 0 | 0 | 1 | 0 | 1 | 1 | 0 | 1 | 0 | 0 | 0 | 0 | 1 |
| F | 0 | 0 | 1 | 0 | 1 | 1 | 1 | 0 | 0 | 1 | 0 | 1 | 1 | 0 | 1 |
| G | 0 | 0 | 1 | 0 | 1 | 1 | 1 | 0 | 1 | 0 | 1 | 0 | 1 | 1 | 1 |
| H | 0 | 0 | 0 | 1 | 0 | 1 | 1 | 1 | 1 | 0 | 0 | 1 | 0 | 1 | 1 |
| I | 0 | 0 | 0 | 0 | 1 | 1 | 0 | 0 | 0 | 0 | 1 | 1 | 0 | 0 | 1 |
| J | 0 | 1 | 1 | 0 | 0 | 1 | 0 | 0 | 0 | 1 | 1 | 0 | 1 | 0 | 1 |
| K | 0 | 1 | 1 | 0 | 0 | 1 | 0 | 0 | 1 | 1 | 1 | 1 | 1 | 0 | 1 |
| L | 0 | 0 | 1 | 1 | 0 | 0 | 1 | 0 | 1 | 0 | 1 | 0 | 0 | 1 | 1 |
| M | 0 | 0 | 0 | 1 | 1 | 0 | 0 | 1 | 1 | 0 | 0 | 1 | 1 | 1 | 1 |
| N | 0 | 0 | 0 | 0 | 1 | 1 | 0 | 1 | 0 | 0 | 0 | 1 | 1 | 0 | 1 |
| O | 0 | 0 | 0 | 0 | 1 | 1 | 0 | 1 | 1 | 0 | 0 | 0 | 1 | 1 | 1 |
| P | 0 | 0 | 1 | 1 | 1 | 0 | 0 | 0 | 0 | 0 | 1 | 1 | 0 | 1 | 1 |
| Q | 0 | 0 | 1 | 1 | 1 | 0 | 0 | 0 | 1 | 1 | 1 | 1 | 0 | 1 | 1 |
| R | 0 | 0 | 0 | 1 | 1 | 1 | 0 | 0 | 1 | 0 | 1 | 0 | 1 | 0 | 1 |
| S | 0 | 0 | 0 | 0 | 1 | 1 | 1 | 0 | 1 | 1 | 0 | 1 | 0 | 0 | 1 |
| T | 0 | 0 | 0 | 0 | 1 | 1 | 1 | 1 | 0 | 0 | 0 | 0 | 0 | 1 | 1 |
| U | 0 | 0 | 1 | 1 | 1 | 1 | 1 | 0 | 0 | 1 | 1 | 1 | 0 | 0 | 1 |
| V | 0 | 0 | 1 | 1 | 1 | 1 | 1 | 0 | 1 | 0 | 1 | 1 | 1 | 1 | 1 |
| W | 0 | 0 | 1 | 1 | 1 | 1 | 1 | 1 | 0 | 1 | 1 | 0 | 0 | 1 | 1 |
| X | 0 | 1 | 1 | 1 | 1 | 1 | 1 | 1 | 0 | 1 | 0 | 1 | 1 | 1 | 1 |
| Y | 1 | 1 | 1 | 1 | 1 | 1 | 1 | 1 | 0 | 1 | 0 | 1 | 0 | 1 | 1 |
| Z | 1 | 1 | 1 | 1 | 1 | 1 | 1 | 1 | 1 | 0 | 0 | 0 | 0 | 1 | 1 |
| OTHER BINARY COMBINATIONS WHICH CORRESPOND TO CODES THAT ARE NOT COMPLETELY SHIFTED IN | | | | | | | | | d | d | d | d | d | 0 |

INVENTOR
W. O. FLECKENSTEIN
BY Alan C. Rose
ATTORNEY

United States Patent Office 3,051,940
Patented Aug. 28, 1962

3,051,940
VARIABLE LENGTH CODE GROUP CIRCUITS
William O. Fleckenstein, Whippany, N.J., assignor to Bell
Telephone Laboratories, Incorporated, New York,
N.Y., a corporation of New York
Filed Sept. 4, 1958, Ser. No. 759,013
5 Claims. (Cl. 340—347)

This invention relates to data processing circuits for handling variable length codes.

Variable length codes are well known in the data handling art. One classical example of such a code is the Morse code. The average time for the transmission of information is reduced by the use of such codes, because the shorter code groups can be used to represent the most frequently used characters. Thus, for example, in the Morse code a dot represents the letter "E" and the sequence "dot-dash" represents an "A." More recently, it has been determined that certain variable length binary codes are self-synchronizing. Accordingly, of the decoder at a receiving terminal initially receives an incomplete code group of this type, it soon regains synchronism with the encoder at the transmitting terminal.

Despite these advantages of variable length codes, the recent trend has been toward using standard length code groups. The explanation for this trend apparently lies in the increased mechanization of data handling equipment. From a superficial standpoint, it appears to be simpler and more straightforward to implement an automatic system by using standard length code groups. However, the disadvantages inherent in the use of standard length code groups include the greater number of digits per symbol required to transmit a message and the extra synchronization circuitry which is required.

Accordingly, the principal object of the present invention is to implement variable length code encoding and decoding circuitry in a simple and inexpensive manner.

Another object of the present invention is the reduction of channel space required for transmitting coded information.

In accordance with the present invention, these objects are achieved through the use of extra marker pulses in the shift registers at the encoder and decoder of a variable length code system. At the encoder shift register, the variable length codes are applied to the shift register in parallel, and an extra marker digit is added to the end of the code. Detection circuitry is coupled to stages of the shift register excluding the output stage to determine the shift interval in which the marker digit reaches the shift register output stage. The marked digit is then cleared from the output stage and a new variable length code is applied to the shift register including the output stage. The transmitted code groups therefore do not include the marker digit. In addition, the code groups may include digits at the beginning and end which correspond to the cleared state of the shift register.

At the decoder, each code group is entered serially into a shift register. An output translator circuit is coupled in parallel to the decoding shift register. Following the recognition of a character by the translator, all of the stages of the shift register except the input stage are cleared. A marker indication is inserted in the input stage of the shift register to precede the next subsequent code groups. This facilitates recognition of the code groups, particularly code groups beginning with a digital signal corresponding to the cleared state of a shift register stage.

In accordance with a feature of the invention, a data processing system for variable length codes includes an encoding and a decoding shift register, and translation circuitry for applying variable length codes to the output end of the encoding shift register and for deciphering code groups at the input end of the decoder shift register. In addition, the system includes circuitry for providing marker signals at the end of code groups applied to the encoding shift register and at the beginning of code groups as they are applied to the decoding shift register.

In accordance with another feature of the invention, a code group transmiter includes a shift register, circuitry for applying code groups to the shift register and for concurrently adding a marker signal to the end of each code group, and also includes circuitry for deleting the marker signal as each code group is shifted out of the shift register.

Other objects, features, and advantages of the invention may be readily understood from a consideration of the following detailed description and the accompanying drawing, in which:

FIG. 2 is a definitive specification, or "truth table," for the encoding translator of FIG. 1; and FIG. 3 is a "truth table" for the decoding translator of FIG. 1.

Figure 1:
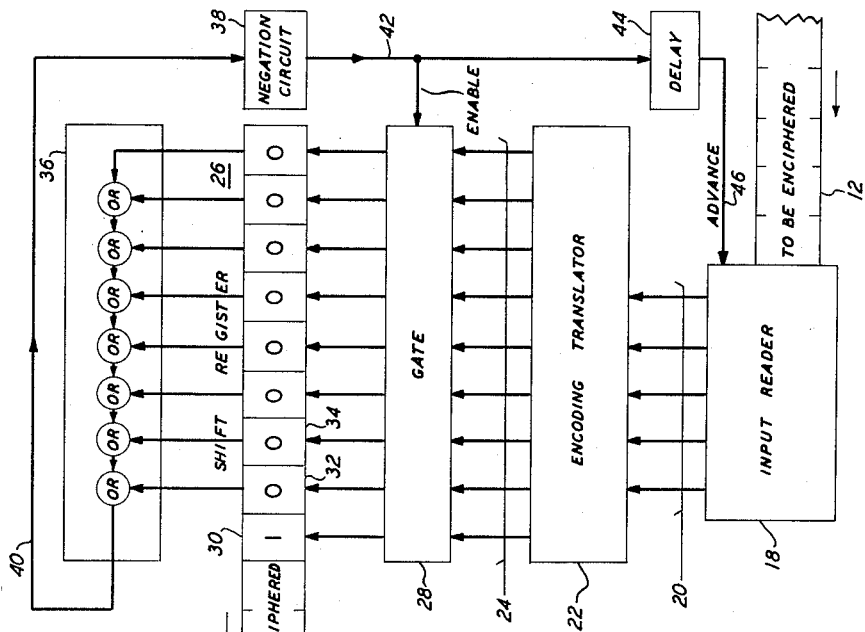
FIG. 1 is a block diagram of a circuit for handling variable length code groups in accordance with an illustrative embodiment of the invention.
Figure 1:
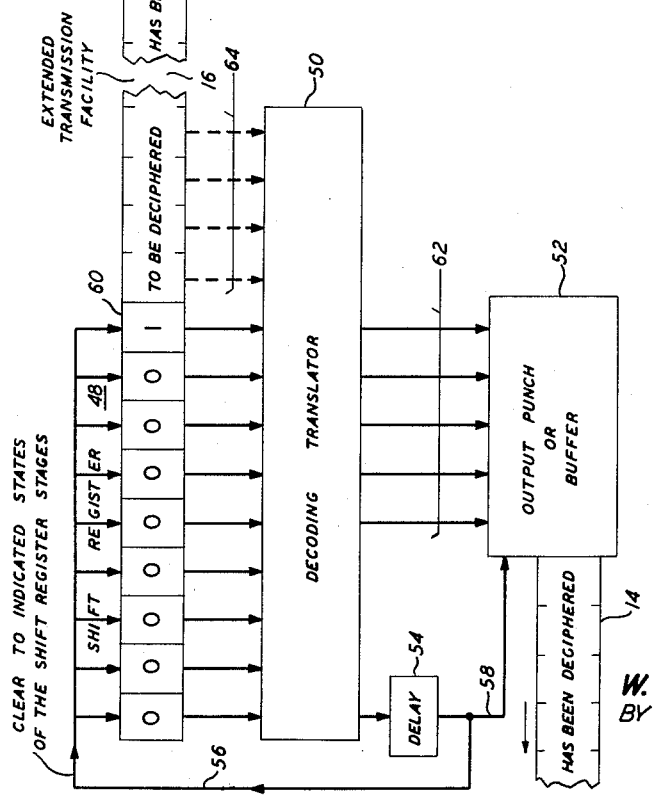

In FIG. 1, it may be noted that the encoder appears at the right-hand side of the circuit, and that the decoder appears to the left-hand side of he circuit, contrary to the usual convention in which signals are shown proceeding from left to right. This change has been adopted in order to facilitate the consideration of code groups being transmitted from the encoder to the decoder. When the convention shown in FIG. 1 is employed, the code groups appear spaced along the transmission circuitry or in the shift registers in the same order that they would normally appear in tabular form.

Although the present invention is applicable to the transmission of nearly any form of variable length digital codes, one specific example will be considered in some detail. Specifically, the circuit of FIG. 1 will be described in the context of a standard fixed length teletype code applied on the input tape 12. Similarly, the same standard five-digit teletype code appears at the output 14 from the decoding circuitry. The variable length code which is transmitted over the extended transmission facility 16 is one which was developed by Messrs. E. N. Gilbert and E. F. Moore. Circuitry for utilizing the unique properties of the Gilbert-Moore code is disclosed in a copending application Serial No. 759,067, now Patent No. 3,016,527 of Messrs. Gilbert and Moore entitled "Apparatus and Method for Utilizing Variable Length Alphabetized Codes," which was filed on September 4, 1958 concurrently with the present application. The Gilbert-Moore application is now Patent 3,016,527, issued January 9, 1962.

In the following table, the correspondence between the letters of the alphabet, the standard teletype code, and the Moore-Gilbert code is set forth.

TABLE I

| Letter | Teletype Code | Moore-Gilbert Code |
|---|---|---|
| Space | 00100 | 00 |
| A | 11000 | 0100 |
| B | 10011 | 010100 |
| C | 01110 | 010101 |
| D | 10010 | 01011 |
| E | 10000 | 0110 |
| F | 10110 | 011100 |
| G | 01011 | 011101 |
| H | 00101 | 01111 |
| I | 01100 | 1000 |
| J | 11010 | 1001000 |
| K | 11110 | 1001001 |
| L | 01001 | 100101 |
| M | 00111 | 10011 |
| N | 00110 | 1010 |
| O | 00011 | 1011 |
| P | 01101 | 110000 |
| Q | 11101 | 110001 |
| R | 01010 | 11001 |
| S | 10100 | 1101 |
| T | 00001 | 1110 |
| U | 11100 | 111100 |
| V | 01111 | 111101 |
| W | 11001 | 111110 |
| X | 10111 | 1111110 |
| Y | 10101 | 11111110 |
| Z | 00001 | 11111111 |

Referring again to FIG. 1, the input teletype signals on the tape 12 are sensed by the input reader 18. Combinational output signals are provided on the leads 20 which couple the input reader 18 to the encoding translator 22. The operation of the encoding translator 22 is specified in the "truth table" shown in FIG. 2 of the drawing. In FIG. 2, the teletype input signals are shown in five columns to the left of the double line, and the output signals on leads 24 are shown in the nine right-hand columns of FIG. 2.

It may be noted that the table of FIG. 2 is similar to that of Table I set forth above, with the exception that an additional "1" appears at the right-hand side as a suffix to each code group. To point up the variable length of the codes which are employed, the codes, together with the market bits, are printed boldly in FIG. 2. A similar technique is employed in FIG. 3, which relates to the decoder.

Returning to the use of the marker suffix "1," it may be noted in Table I that the code group representing a space is as follows: "00." At the output of the encoding translator 22, however, this symbol appears as "001." At the appropriate time, the output signals on leads 24 are applied to the shift register 26 by the gate 28. The variable length codes are always applied to the shift register 26 adjacent the output end 30 of this register. Thus, for example, the space code group "001" would be applied to stages 30, 32, and 34 of shift register 26. As the code group is shifted out of the shift register 26 toward the extended transmission facility 16, the final marker bit eventually reaches the output stage 30 of the shift register 26. An output control signal is then provided by the logic circuit 36 and the negation circuit 38. As long as the marker signal 30 is in the shift register 26 in a stage other than the output stage, a binary "1" signal is applied through the OR gates in the logic circuit 36 to lead 40. This signal is negated by the circuit 38 so that a binary "0" appears on lead 42. In accordance with the usual practice, a binary "1" is represented by a pulse in a given time interval, and a binary "0" by the absence of a pulse. When the marker pulse reaches output stage 30, however, as indicated in FIG. 1, the output from logic circuit 36 will be a binary "0." Under these circumstances, a binary "1" signal appears on lead 42 to enable gate 28.

When the enabling signal from lead 42 is applied to gate 28, the code group signals from leads 24 are transferred to shift register 26. In addition, the final shift register stage 30 is cleared, and an appropriate digit of the new code group is inserted into this stage. Following a brief time interval provided by the delay circuit 44, an advance signal is applied on lead 46 to the input reader 18. Signals representing the next character from the teletype tape 12 are then applied to leads 20. The successive encoding operations described above are then repeated with additional input signals being translated as successive marker pulses reach the output stage 30 of shift register 26.

The decoding circuitry includes the shift register 48, the decoding translator 50, and the output punch or buffer 52, which transmits signals to the teletype output tape 14. When the decoding translator 50 recognizes a code group shifted into the register 48, an output control signal is applied through the delay circuit 54 to the control leads 56 and 58.

The signal applied to the clear lead 56 resets the shift register 48 to the state shown in FIG. 1. More specifically, the shift register 48 is reset to the state in which all of the stages except the input stage 60 are in the binary "0" state. However, a marker pulse is inserted in the initial input stage 60 of the decoding shift register 48.

The "truth table" of FIG. 3 indicates the relationship between the signals present in the shift register 48 and the output signals on leads 62 intercoupling the decoding translator 50 and the output punch 52. The need for the marker pulse as discussed above may readily be appreciated by noting the confusion which could otherwise occur in the interpretation of the various transmitted code groups, because the reset state of each stage of the shift register corresponds to the "0" symbol representing digits in the code groups.

The output punch, or buffer, circuit 52 is enabled by signals on lead 58. The delay provided by circuit 54 is sufficient for the registration of control signals from leads 62 in the output circuit 52. Accordingly, when the enabling signal arrives on lead 58, the proper teletype signal is punched into the output tape 14.

Various additional ramifications of the circuitry of FIG. 1 merit brief consideration. Thus, for example, in the encoder circuit each stage of the shift register 26 except the final output stage 30 is connected to an OR circuit included in circuit 36. For the Moore-Gilbert code set forth above in Table I, only five connections from the five shift register stages adjacent output stage 30 are required. The need for five connections is determined by the code group "110000" representing the letter P. Because this code group includes four consecutive "0's" connections must be made from five shift register stages to the logic circuit 36 to determine the time when the marker bit is shifted to shift register output stage 30.

The Moore-Gilbert code has the property that no code group is the prefix for any other code group. In other known sets of variable length code groups, some codes may be the prefix for other codes, and the individual code groups may still be uniquely decipherable. If a set of code groups of this last-mentioned type were employed, additional shift register stages and output leads are required to the right of the shift register 48 associated with the decoder. The output leads shown at 64 dash-dot lines represent these additional connections to the decoding translator 50. By checking the signals on these leads, it may be determined whether or not a given code group entered in the main portion of shift register 48 is merely the prefix to another code group.

Concerning the instrumentation of the circuitry shown in FIG. 1, the shift registers and the logic circuits are of a conventional nature. The shift register, for example, may be a series of coupled flip-flops, a tapped delay line, or may take other known forms. Suitable AND, OR, and shift register circuits are shown, for example, in a book entitled "High-Speed Computing Devices" by Engineering Research Associates, McGraw-Hill Book Company, Inc., New York, 1950. Other suitable logic circuits are disclosed in an article entitled "Regenerative Amplifier for Digital Computer Applications" by J. H. Felker which appeared on pages 1584 through 1596 of the November, 1952 issue of the Proceedings of the I.R.E. (volume 40, No. 11). The gate circuit 28 may be composed of a group of AND gates each having one input connected to one of the leads 24 and the other input enabled by signals from lead 42. The encoding translator 22 and the decoding translator 50 may be readily devised by a person skilled in the design of logic circuits from the tables of FIGS. 2 and 3. The Boolean algebraic equations for the necessary circuits are worked out in detail in the application of E. N. Gilbert and E. F. Moore mentioned above. In addition, at least one representative circuit showing the implementation of one of the Boolean algebraic equations in terms of logic, AND, and OR circuits is also disclosed in that application. Suitable modulation circuits may, of course, be included between the encoding shift register 26 and the decoder 60. Signals may be applied to the extended transmission facility 16 at the same rate that information is shifted through the register 26.

With variable length codes of the type shown in Table I, no separate synchronization signals need be transmitted to the decoder to indicate the end of a code group. However, synchronization signals corresponding to the arrival of successive binary digits are developed at the receiver by conventional techniques. These signals may, for example, be employed to control the shifting of information through the decoding shift register. In regard to the timing of operations in the encoding and decoding circuitry, logic circuits may be employed which utilize successive portions of digit periods for successive sequential operations. Thus, for example, with regard to the encoding circuitry of FIG. 1, the shifting operation may occur during the initial portion of each digit period and the logic and gating functions may occur during later portions of digit periods. This mode of operation corresponds to the actuation of logic circuits in successive phases of a master, or clock, control signal as disclosed in the Felker article cited above.

It is to be understood that the above-described arrangements are illustrative of the application of the principles of the invention. Numerous other arrangements may be devised by those skilled in the art without departing from the spirit and scope of the invention.

What is claimed is:

1. In combination in a system for processing variable length codes, an encoding shift register including a terminal output stage, a decoding shift register including a terminal input stage, a data link interconnecting said terminal output stage and said terminal input stage, fixed length code-to-variable length code translation means for applying variable length code words each including a marker suffix designation to the output stages of said encoding shift register, means coupled to all of the output stages excluding the terminal output stage of said encoding shift register for providing an indication of the absence of signals in said stages, means responsive to said indication for clearing said marker designation from said output stage of said encoding shift register and for enabling said translation means to apply another variable length code including a marker suffix designation to said encoding shift register, additional translation means coupled to said decoding shift register for decoding code words appearing in the input stages of said decoding shift register, and means responsive to the decoding of a code word by said additional translation means for clearing all of the input stages excluding the terminal input stage of said decoding shift register and for inserting a marker designation in the terminal input stage thereof as a prefix to the next code word to be decoded.

2. In a digital variable length code group transmitter, an encoder including a shift register, means for shifting information serially out of said shift register, fixed length code-to-variable length code translation means for inserting variable length code groups in parallel into the stages of said register adjacent the output end of said register, said translation means including means for concurrently inserting a marker designation into the shift register stage adjacent the last stage of said register which includes a digit of the variable length code group, means coupled to a plurality of stages of said shift register excluding the output stage for providing an indication of the absence of signals in these stages of the shift register, and means responsive to said indication for clearing the output stage of said register and enabling said translation means.

3. In a data processing system for handling variable length code groups, an encoder including a shift register, means for shifting information serially out of said shift register, fixed length code-to-variable length code translation means for inserting variable length code groups in parallel into the output stages of said shift register, said translation means including means for concurrently inserting a marker designation into the shift register stage adjacent the last stage of said register which includes a digit of the variable length code, means coupled to said shift register for providing an indication that said marker designation is in a selected stage of said shift register, and means responsive to said indication for clearing the selected stage of said register and enabling said translation means.

4. In combination, binary storage means having serial and parallel access circuitry, said storage means having a predetermined output binary storage location for the serial transmission of output signals and each binary storage location having a normal state and an energized state, fixed length code-to-variable length code translation means for applying variable length binary code signals to said output storage location and the adjacent storage locations of said storage means, said translation means including means for energizing an additional binary storage location to provide a marker signal adjacent the last digit of said code signals, means for providing an indication of the arrival of said marker signal at the output storage location of said storage means, and means responsive to said indication for clearing said output storage location and enabling said translation means.

5. In combination in a data processing system for transmitting variable length code groups, a data link, shift register means including a final output stage coupled to said data link, first circuit means for applying variable length code groups respectively including marker signal suffixes to said shift register means, means for serially shifting code groups through said shift register means to said data link, and second circuit means responsive to the presence of a marker signal in said final output stage for deleting said marker signal and enabling said first circuit means.

References Cited in the file of this patent

UNITED STATES PATENTS

| | | |
|---|---|---|
| 2,706,215 | Van Duuren | Apr. 12, 1955 |
| 2,875,270 | Wendt et al. | Feb. 24, 1959 |
| 2,894,067 | Hausman | July 7, 1959 |
| 2,932,688 | Wright | Apr. 12, 1960 |
| 2,946,044 | Bolgiano | July 19, 1960 |